June 30, 1925.

1,544,524

O. A. BANNER

OIL ENGINE

Filed Dec. 22, 1924

INVENTOR.
OTTO A. BANNER.
BY
ATTORNEY.

Patented June 30, 1925.

1,544,524

UNITED STATES PATENT OFFICE.

OTTO A. BANNER, OF MILWAUKEE, WISCONSIN, ASSIGNOR TO THE FALK CORPORATION, OF MILWAUKEE, WISCONSIN, A CORPORATION OF WISCONSIN.

OIL ENGINE.

Application filed December 22, 1924. Serial No. 757,388.

*To all whom it may concern:*

Be it known that I, OTTO A. BANNER, a citizen of Germany, residing at Milwaukee, in the county of Milwaukee and State of Wisconsin, have invented certain new and useful Improvements in Oil Engines, of which the following is a full, clear, concise, and exact description, reference being had to the accompanying drawings, forming a part of this specification.

This invention relates to oil engines of the type in which the fuel is introduced in the form of opposed airless fuel sprays injected into the compression or combustion chamber having cooled walls and communicating with the piston space through a restricted throat or passage.

In some such engines, heretofore known, the chamber has been designed with the sole aim of obtaining a thorough mixture of the entire fuel charge with the air in the chamber prior to combustion. In such instances, every effort is made to so shape the chamber as to avoid the formation of air pockets which might not receive their allotted portion of fuel, and to so introduce the fuel that the same may be distributed throughout the chamber. To this end, the flow of air through the throat during the compression stroke of the piston is utilized to effect such distribution, the fuel being introduced in the form of opposed conical sprays directed contra to the air flow and arranged to meet within such flow. Such engines operate on an explosive cycle so that very high mean effective pressures cannot be attained without excessive maximum pressures which produce serious pounding with destructive shocks to the engine. Furthermore, the low compression pressures necessarily employed in such engines require the use of some form of ignition device, particularly when starting the engine from cold.

Attempts have heretofore been made to overcome these objections by delaying or prolonging the fuel injection period. In engines heretofore designed, however, such efforts have not proven entirely satisfactory, due to the great difficulty in rendering the air in the chamber available to support combustion, and the consequent inability to effect complete combustion of the fuel in quantities sufficient to attain high mean effective pressures. So far as I am aware, it has been impossible to operate such prior engines at mean effective pressures greater than sixty-five or seventy pounds per square inch without producing a smoky exhaust with marked increase in fuel consumption. Such engines are therefore relatively heavy and costly.

I have designed engines with chambers of novel form which, with a novel formation and arrangement of fuel sprays, operate entirely satisfactorily without utilizing the flow of air through the throat caused by the compression stroke of the piston. In such engines the timing of the fuel injection can be so retarded that practically all of the combustion may occur after compression dead center, with complete combustion of fuel in such quantities as to attain high mean effective pressures. In fact, I have operated large engines of this form continuously at mean effective pressures of eighty pounds per square inch and more with clear exhaust and low fuel consumption and without trace of overheating or pounding. Such engines are relatively light in weight and low in cost. In my copending applications, Serial No. 544,412 and Serial No. 544,413, both filed March 17, 1922, I have described engines of the type mentioned, capable of operating in the manner just described. In each of these engines the fuel is introduced in the form of substantially flat sprays which meet to form a narrow, elongated cloud of concentrated fuel mist immediately above the throat. The fuel is introduced at or immediately prior to compression dead center, when movement of the piston has practically ceased and the air in the chamber is at rest. The relatively light fuel mist surrounding the surfaces of the sprays initiates combustion and the consequent increase in temperature and pressure in the chamber tends to vaporize the heavier fuel and forces the same through the throat during the working stroke of the piston. The narrow concentrated fuel cloud is broken up during its passage through the throat and thoroughly mixed and initiated with the unsaturated air passing into the cylinder. Thus, although initial combustion occurs in the chamber the major portion of the combustion occurs largely within the piston space.

One object of the present invention is to further improve the combustion and increase the efficiency of engines of this type. This I have accomplished by introducing the fuel, substantially at compression dead center, in the form of substantially flat sprays which meet to produce a narrow elongated concentrated fuel cloud at one side of the throat. With sprays so formed and arranged I have obtained perfect operating conditions with mean effective pressures of ninety pounds per square inch and more. The demonstrated success of this method is attributed to the fact that this eccentric disposition of the concentrated fuel cloud leaves a large body of air unsaturated with fuel at the other side of the throat. Then as the piston begins its working stroke and the fuel in the concentrated cloud advances toward the throat, it meets and mixes with this body of air which is thus presented in sufficient quantity to support combustion of all the fuel.

A clearer understanding of the present invention may be had from the following detailed description of an illustrative embodiment thereof.

Figure 1:
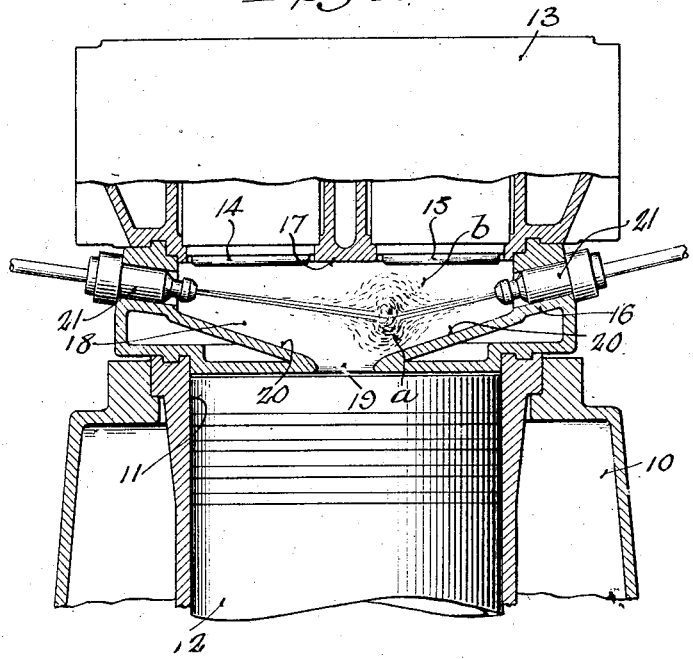
Figure 1 is a sectional view of an engine cylinder embodying the present invention.
Figure 2:
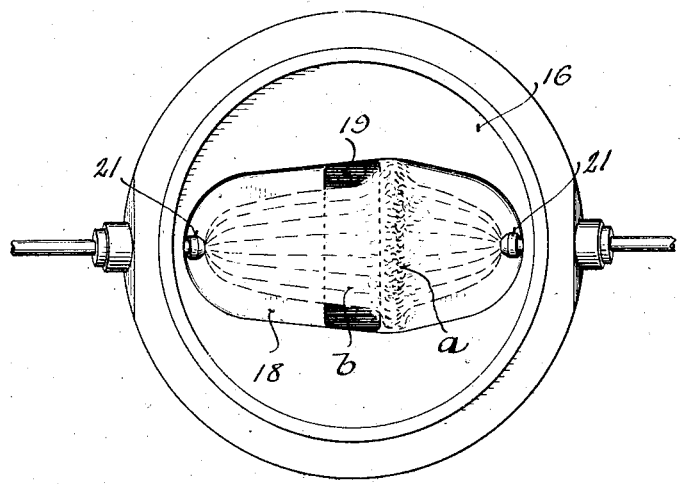
Figure 2 is a plan view of the compression chamber thereof with the head removed.

The cylinder selected for illustration comprises the usual water cooled body portion 10, having a piston space 11, in which the piston 12 reciprocates, and a water cooled cylinder head 13, provided with the usual air intake and exhaust valves 14 and 15. A water jacketed plate or partition 16 is interposed between the head 13 and cylinder 10. This partition is hollowed out, as indicated, and cooperates with the inner flat face 17 of the head to form an elongated compression chamber 18 extending transversely of the cylinder and so dimensioned as to accommodate the valves. A narrow opening 19 formed through the bottom of the partition 16 provides a restricted throat or passage between the chamber 18 and piston space 11. It will be noted that the chamber is of substantially flat form, except that the flat bottom walls 20 thereof slope from the ends of the chamber toward the throat so that the air contents of the chamber is concentrated near the throat.

Two opposed fuel injection nozzles 21 are disposed at the opposite ends of the chamber. These nozzles are of the type described in my copending application, Serial No. 714,266, filed May 19, 1924, and are capable of delivering substantially flat fuel sprays into the chamber. The nozzles in this instance are unsymmetrically disposed so that the issuing sprays meet in a zone at one side of the center or axis of the throat 19.

In operation, the fuel is injected under pump pressure, and without air, through the nozzles 21, in a sudden substantially instantaneous charge at or immediately prior to compression dead center, when the compression stroke of the piston has practically ceased and the air in the chamber is at rest. The sudden impact of the opposed flat sprays, thus formed, produces a dense cloud $a$ of relatively heavy fuel mist, momentarily suspended in the chamber at one side of the throat. Because of the flat form of the sprays this cloud is of a long narrow form and hence readily permeated by the heat of combustion and easily broken up by later turbulence within the chamber. A relatively light fuel mist $b$ is simultaneously formed about the concentration cloud and at the surfaces of the fuel sprays, due largely to the frictional contact of the high velocity sprays with the compressed air in the chamber. This lighter fuel mist is readily vaporized and ignited by the heat of compression and combustion sets in. The heat developed by this combustion of the surrounding light fuel mist permeates the narrow concentrated fuel cloud so as to vaporize a large portion of the fuel therein and thereby prepare the same for quick burning. Simultaneously, the piston begins its working stroke and the contents of the chamber, agitated by the combustion, begins to flow through the throat. During such flow the dense cloud of partially vaporized fuel is broken up by the resulting turbulence and carried toward the throat where it is met by and mixed with the large body of hot unsaturated air which is simultaneously flowing toward and through the throat from the other side thereof and prompt and complete combustion occurs. The eccentric disposition of the original dense fuel cloud within the chamber and at one side of the throat leaves unsaturated air at the other side of the throat where it is promptly available in sufficient quantities to entirely support the combustion of the fuel, during the passage of this air and fuel toward and through the throat.

Various changes may be made in the embodiment of the invention hereinabove specifically described, without departing from or sacrificing any of the advantages of the invention as defined in the appended claims.

I claim:

1. In an oil engine the combination of a cylinder having a piston space and a substantially flat elongated chamber extending transversely thereof, a restricted passage between said space and chamber, and means at opposite ends of said chamber for producing a pair of substantially flat inclined fuel sprays which meet in a zone eccentrically disposed in said chamber and at one side of said passage.

2. In an oil engine the combination of a cylinder having a piston space and a substantially flat elongated chamber extending transversely thereof, a restricted passage between said space and said chamber, and means at opposite ends of said chamber for producing a pair of substantially flat fuel sprays which meet in a zone eccentrically disposed in said chamber and at one side of said passage.

3. In an oil engine the combination of a cylinder having a piston space and a substantially flat elongated chamber extending transversely thereof, a restricted passage between said space and said chamber, and means at opposite ends of said chamber for producing a pair of substantially flat fuel sprays which meet in a zone eccentrically disposed in said chamber.

4. In an oil engine the combination of a cylinder having a piston space and a substantially flat elongated chamber extending transversely thereof, a restricted passage between said space and said chamber, and means at opposite ends of said chamber for producing a pair of substantially flat fuel sprays which meet in a zone at one side of said passage.

5. In an oil engine the combination of a cylinder having a piston space and an elongated chamber extending transversely thereof, a restricted passage between said space and said chamber, and means at opposite ends of said chamber for producing a pair of fuel sprays which meet in a zone eccentrically disposed in said chamber.

6. In an oil engine the combination of a cylinder having a piston space and an elongated chamber extending transversely thereof, a restricted passage between said space and said chamber, and means at opposite ends of said chamber for producing a pair of fuel sprays which meet in a zone disposed at one side of said passage.

7. In an oil engine the combination of a cylinder having a piston space and an elongater chamber extending transversely thereof, a restricted passage between said space and chamber, and means at opposite ends of said chamber for producing opposed fuel sprays which meet in a zone eccentrically disposed in said chamber and at one side of said passage.

8. In an oil engine the combination of a cylinder having a piston space and a chamber with cooled walls, a restricted passage between said space and said chamber, and opposed fuel injection nozzles for producing airless fuel sprays which meet in a zone eccentrically disposed in said chamber and at one side of said passage.

9. In an oil engine the combination of a cylinder having a piston space and a chamber with cooled walls, a restricted passage between said space and said chamber, and opposed fuel injection nozzles for producing airless fuel sprays which meet in a zone eccentrically disposed in said chamber.

10. In an oil engine the combination of a cylinder having a piston space and an elongated chamber extending transversely thereof, a restricted passage through the bottom of said chamber, the top of said chamber being substantially flat and the bottom thereof comprising surfaces sloping toward said passage, and means for producing a narrow cloud of concentrated fuel mist in said chamber at one side of said passage.

11. The improved method of operating an oil engine having a compression chamber, piston space, and a restricted passage therebetween which consists in forming a concentrated cloud of fuel mist within said chamber at one side of said throat substantially at compression dead center, providing a body of air unsaturated with fuel in said chamber at the other side of said passage, and utilizing the flow through said passage during the working stroke to effect a combustible mixture of said air and fuel.

12. The improved method of operating an oil engine having a compression chamber, piston space, and a restricted passage therebetween which consists in forming a narrow concentrated fuel cloud eccentrically disposed within said chamber substantially at compression dead center, providing a body of air unsaturated with fuel in said chamber at the other side of said passage, and utilizing the flow through said passage during the working stroke to effect a combustible mixture of said air and fuel.

In witness whereof, I hereunto subscribe my name this 9th day of December, 1924.

OTTO A. BANNER.